(12) United States Patent
Nagaoka

(10) Patent No.: US 8,189,435 B2
(45) Date of Patent: May 29, 2012

(54) SPHERICAL ABERRATION DETECTING DEVICE AND AN OPTICAL PICKUP DEVICE INCLUDING SAME

(75) Inventor: Satoshi Nagaoka, Higashihiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 857 days.

(21) Appl. No.: 11/861,888

(22) Filed: Sep. 26, 2007

(65) Prior Publication Data
US 2008/0080344 A1 Apr. 3, 2008

(30) Foreign Application Priority Data
Oct. 3, 2006 (JP) ................................. 2006-272243

(51) Int. Cl.
*G11B 7/00* (2006.01)

(52) U.S. Cl. ..................................... 369/44.41; 369/120

(58) Field of Classification Search .......................... None
See application file for complete search history.

(56) References Cited

U.S. PATENT DOCUMENTS

| | | | |
|---|---|---|---|
| 6,498,330 | B1 | 12/2002 | Yoshida |
| 6,967,916 | B2 * | 11/2005 | Sano et al. ................. 369/53.12 |
| 7,483,360 | B2 * | 1/2009 | Masui et al. ................. 369/120 |
| 2002/0057359 | A1 | 5/2002 | Tadano et al. |
| 2004/0151087 | A1 * | 8/2004 | Shibuya et al. ............. 369/44.32 |
| 2006/0098540 | A1 * | 5/2006 | Ando ......................... 369/44.41 |
| 2006/0104173 | A1 * | 5/2006 | Shibuya et al. ............. 369/44.37 |
| 2006/0164951 | A1 * | 7/2006 | Yamasaki et al. ........ 369/112.01 |
| 2006/0198259 | A1 * | 9/2006 | Yumita ...................... 369/44.28 |
| 2007/0237040 | A1 | 10/2007 | Yamasaki et al. |
| 2008/0170481 | A1 | 7/2008 | Ogata |

FOREIGN PATENT DOCUMENTS

| | | |
|---|---|---|
| CN | 1703744 | 11/2005 |
| JP | 2002-055024 A | 2/2002 |
| JP | 2006-065935 A | 3/2006 |
| JP | 2006-244589 | 9/2006 |

* cited by examiner

*Primary Examiner* — Peter Vincent Agustin
*Assistant Examiner* — Emily Frank
(74) *Attorney, Agent, or Firm* — Morrison & Foerster LLP

(57) ABSTRACT

A photoreceiver includes: a first light-receiving section divided into two regions by a border extending in a radial direction, and is disposed in a portion where it can receive a +1st order diffraction ray of the main beam from the polarization hologram, so as to detect a spherical aberration; a second light-receiving section is divided into two regions by a border extending in the radial direction, and is disposed in a portion where it can receive a +1st order diffraction ray of the first sub-beam from the polarization hologram, so as to detect a spherical aberration; and a third light-receiving section is divided into two regions by a border extending in the radial direction, and is disposed in a portion where it can receive a +1st order diffraction ray of the second sub-beam from the polarization hologram, so as to detect a spherical aberration. The second and third light-receiving sections are laid out such that an end of the second light-receiving section along the tangential direction and an opposite end of the third light-receiving section along the tangential direction are aligned on a straight line extending in the tangential direction across the first light-receiving section.

4 Claims, 15 Drawing Sheets tangential direction radial direction

FIG. 12
PRIOR ART
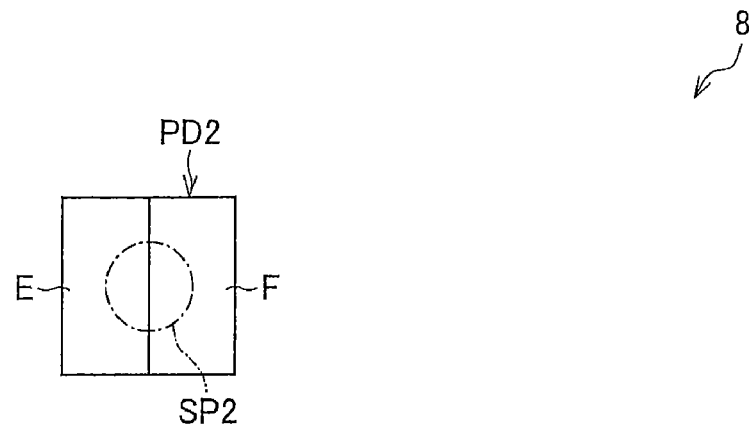
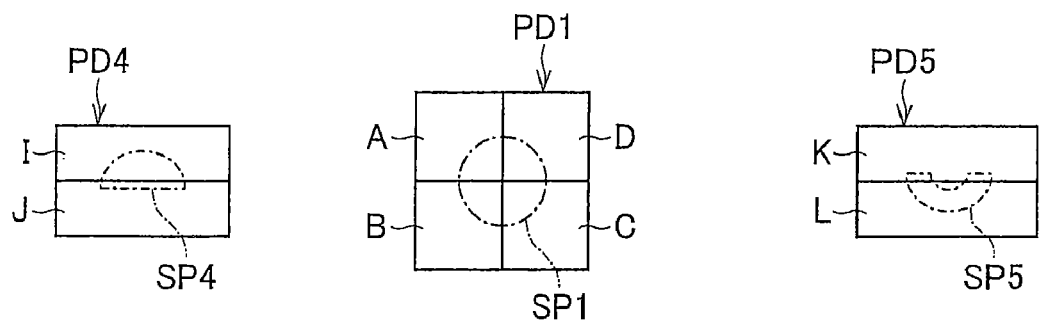
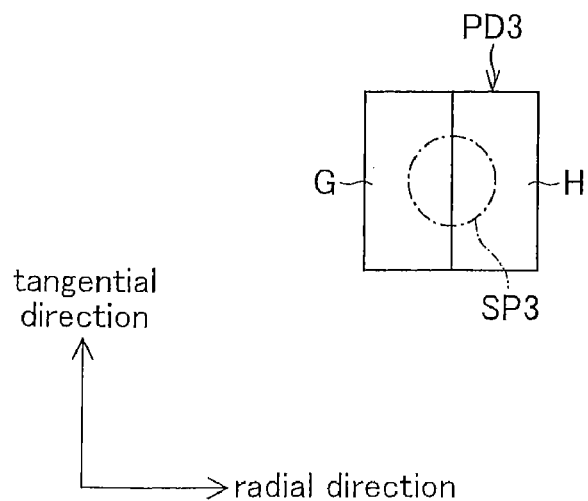

FIG. 14 (a) PRIOR ART 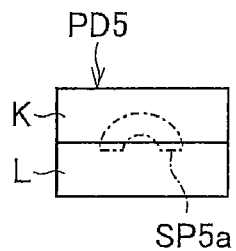
FIG. 14 (b) PRIOR ART 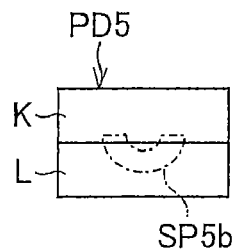
FIG. 14 (c) PRIOR ART 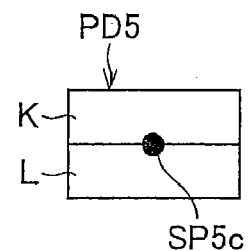
FIG. 15 (a) PRIOR ART 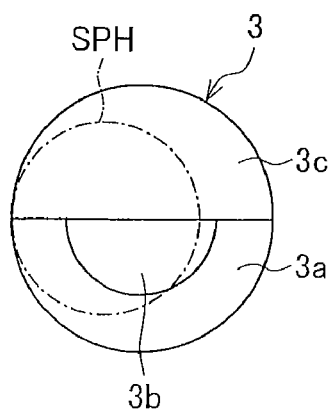
FIG. 15 (b) PRIOR ART 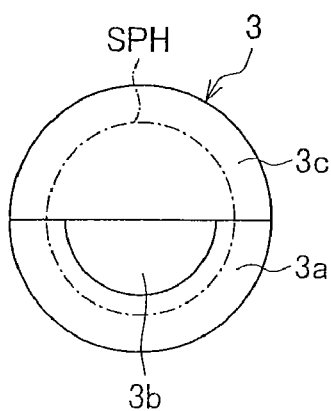
FIG. 15 (c) PRIOR ART 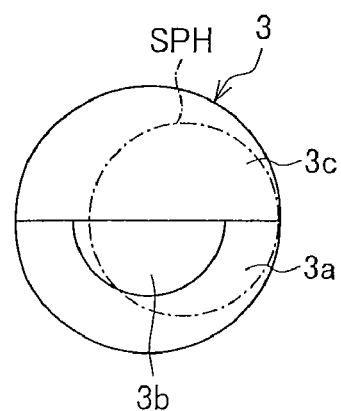

SPHERICAL ABERRATION DETECTING DEVICE AND AN OPTICAL PICKUP DEVICE INCLUDING SAME

This Nonprovisional application claims priority under 35 U.S.C. §119(a) on Patent Application Patent Application No. 2006/272243 filed in Japan on Oct. 3, 2006, the entire contents of which are hereby incorporated by reference.

FIELD OF THE INVENTION

The present invention relates to a spherical aberration detecting device for detecting a spherical aberration of an optical disk, and an optical pickup device including the spherical aberration detecting device.

BACKGROUND OF THE INVENTION

With the increase in density of optical disks in recent years, its information recording layer has higher linear recording density, and its tracks are provided at a smaller pitch. Such density increase in an optical disk also requires reduction in beam diameter of a light beam focused on the information recording layer of the optical disk. This can be achieved by an increase in numerical aperture of the light beam emitted from an objective lens serving as a light-harvesting optical system of the optical pickup device, or a decrease in wavelength of the light beam.

When the light beam passes through a cover glass of an optical disk, a spherical aberration is generated. The magnitude of the spherical aberration is generally proportional to a biquadrate of the numerical aperture, and therefore an error of the spherical aberration gives a certain influence to information recording when the objective lens has a high numerical aperture. For this reason, it is necessary to correct the spherical aberration when the objective lens has a high numerical aperture. The following describes some prior arts regarding detection of spherical aberration.

For example, Japanese Unexamined Patent Publication Tokukai 2002-55024 (published on Feb. 20, 2002) and Japanese Unexamined Patent Publication Tokukai 2000-171346 (published on Jun. 23, 2000) disclose a method of detecting a spherical aberration in a light-harvesting optical system using hologram diffraction ray. Also, Japanese Unexamined Patent Publication Tokukai 2002-157771 (published on May 31, 2002) discloses a method of detecting spherical aberration by appropriately dividing a light beam by a hologram. In this method, the difference between the positions where the spot diameters of the respective light beams are minimized is increased, which further increases the degrees of focal displacement of the respective light beams. In this manner, the spherical aberration can be detected at high sensitivity. Further, Japanese Unexamined Patent Publication Tokukai 2006-65935 (published on Mar. 9, 2006) discloses detection of a spherical aberration using a hologram with an optical pickup device having an optical integrated unit which is arranged such that the diameter of a light beam on a diffraction grating is increased to provide a longer light path between a diffraction element and a photoreceiver.

FIG. 11 is a drawing showing a layout of optical system components in a conventional optical pickup device 101. This optical pickup device 101 includes a semiconductor laser 1, a beam splitter 2, a polarization hologram 3, a transmission grating 4, a collimator lens 5, an objective lens 6 and a photoreceiver 8. FIG. 10 shows a pattern of the polarization hologram 3. FIG. 12 shows a structure of the photoreceiver 8. The light emitted from the semiconductor laser 1 (light source) passes through the beam splitter 2, and is incident on the polarization hologram 3. The incident light transmits through the polarization hologram 3, and is divided into three beams by a transmission grating 4 in a tangential direction, before being condensed onto the surface of the optical disk 7 by the collimator lens 5 and the objective lens 6. Passing through the collimator lens 5 and the objective lens 6, the reflection light from the optical disk 7 is again incident on the polarization hologram 3.

The polarizing directions of the light beams incident on the polarization hologram 3, i.e., the light from the light source and the reflection light of the optical disk 7 has a 90° difference which is given by a wavelength plate (not shown). As a result, the light beam from the semiconductor laser 1 passes through the polarization hologram 3, and the reflection light from the optical disk 7 is diffracted by the characteristic of the polarization hologram 3, and the resulting light beams are respectively focused onto the five separate light-receiving sections PD1 to PD5 shown in FIG. 12 in the regions 3a to 3c of the polarization hologram 3 shown in FIG. 10. FIG. 12 shows the photoreceiver 8 and the light beams condensed thereon.

As shown in FIG. 10, the polarization hologram 3 has a circular shape, and includes regions 3a to 3c. Among them, the region 3c is one of the semicircles divided in a radial direction by a center line. The regions 3a and 3b are included in the other one of the two semicircles of the polarization hologram 3. The region 3b is a semicircle smaller than the region 3c, and the region 3a surrounds the circular arc portion of the regions 3b. The region 3a is an area surrounded by a straight line in the radial direction orthogonal to the optical axis of the light beam, the first semicircle (the other one of the semicircles), and a second semicircle (the circular arc portion) which is concentric to a first semicircle and smaller in radius than the first semicircle.

FIG. 13 shows the diffraction by the polarization hologram 3. As shown in FIG. 13, the light-receiving sections PD1 to PD3 in the photoreceiver 8 are aligned at a predetermined interval along the tangential direction with the light-receiving section PD1 in the center. Meanwhile, the light-receiving sections PD1, PD4 and PD5 are aligned at a predetermined interval along the radial direction with the light-receiving section PD1 in the center.

The main beam MB in the center of the three divided light beams is guided to the light-receiving section PD1 as 0-th order diffraction ray which has passed through the polarization hologram 3, and is condensed as a light spot SP1 as shown in FIG. 12. Further, the sub-beams SB1 and SB2 on the both sides of the main beam MB among the three divided light beams are guided to the light-receiving sections PD2 and PD3, and are condensed as light spots SP2 and SP3. The main beam MB is guided to the light-receiving section PD4 as −1st order diffraction ray which has been generated in the region 3c of the polarization hologram 3, and is condensed as a light spot SP4. The main beam MB is also guided to the light-receiving section PD5 as a +1st order diffraction ray which has been generated in the region 3a of the polarization hologram 3, and is condensed on as a light spot SP5.

As shown in FIG. 12, the light-receiving section PD1 has four divided light-receiving regions A to D, and detects the 0-th order diffraction ray of the main beam having been passed through the polarization hologram 3. The light-receiving section PD2 has two divided light-receiving regions E and F, and detects one of the sub-beams. The light-receiving section PD3 has two divided light-receiving regions G and H, and detects the other of the sub-beams. The light-receiving sections PD2 and PD3 are used for generation of tracking servo signals. The light-receiving section PD4 has two divided light-receiving regions I and J, and detects the −1st order diffraction ray. The light-receiving section PD4 is used for detection of FES signals. The light-receiving section PD5 has two divided light-receiving regions K and L, and detects the +1st order diffraction ray. The light-receiving section PD5 is used for detection of spherical aberration signals (SA signals).

FIG. 12 shows only the +1st order diffraction ray as the light diffracted by the region 3a, and shows only the −1st order diffraction ray as the light diffracted by the region 3c. The light diffracted by the region 3b of the polarization hologram 3 is not discussed here, and therefore not shown in the figure.

When a spherical aberration occurs due to a thickness error of the optical disk 7, as shown in FIGS. 14(a) and 14(b), the light beams focused onto the light-receiving regions K and L of the light-receiving section PD5 form light spots SP5a and SP5b. In each of them, the light-receiving area in the light-receiving region K or L is larger than the light-receiving area of the other light receiving region. Further, if a spherical aberration does not occur, the light beam focused onto the light-receiving regions K and L form a dot light spot SP5c on the interface between the light-receiving regions K and L as shown in FIG. 14(c). It however should be noted that the influence of defocus is not taken into account. Here, expressing the electric signals generated in the light-receiving regions K and L respectively as Sk and Sl, the difference Sk−Sl of these electric signals is calculated. According to the calculation, the signal of Sk−Sl becomes 0 when a spherical aberration does not occur, but the signal of Sk−Sl becomes a positive value or a negative value when a spherical aberration occurs, and therefore a spherical aberration can be detected as a signal.

However, in the conventional optical pickup device 101, the objective lens 6 is shifted in the radial direction (vertical to the track) so as to allow the light spot to follow a concentric or helical track formed on the optical disk 7. With this shifting of the objective lens 6, the spot SPH on the polarization hologram 3 derived from the reflection light of the optical disk 7 is also shifted in the radial direction from the state of FIG. 15(b) into the state of FIG. 15(a) or 15(c). This affects the shapes of the light spot SP5d or the light spot SP5e diffracted onto the light-receiving regions K and L, as shown in FIG. 16(a) or 16(c). This shifting of the objective lens 6 causes a change of shape of the optical light spot, thereby changing the electric signals in the light-receiving regions K and L. Therefore, such shifting of the objective lens 6 causes generation of positive or negative Sk−Sl signals, in contrast to the light spot SP5f of FIG. 16(b) where the objective lens 6 is not shifted. This is called an offset signal, hereinafter.

SUMMARY OF THE INVENTION

The present invention is made in view of the foregoing conventional problems, and an object is to provide a spherical aberration detecting device immune to influence of offset-signals and ensure accurate detection of a spherical aberration in the form of a signal. The present invention also provides an optical pickup device including the spherical aberration detecting device.

In order to attain the foregoing object, a first spherical aberration detecting device according to the present invention comprises: a transmission grating for dividing, in a tangential direction, a light beam emitted from a light source into a main beam, a first sub-beam and a second sub-beam; an optical element for focusing the three beams on an optical disk; a polarization hologram for diffracting a light beam reflected by the optical disk; and a photoreceiver for receiving a diffraction ray from the polarization hologram, wherein: the photoreceiver includes the first through third light-receiving sections adjacently aligned for respectively receiving +1st order diffraction rays of the main beam, the first sub-beam and the second sub-beam generated in the polarization hologram, the first light-receiving section is divided into two regions by a border extending in a radial direction, and is disposed in a portion where it can receive a +1st order diffraction ray of the main beam from the polarization hologram, so as to detect a spherical aberration, the second light-receiving section is divided into two regions by a border extending in the radial direction, and is disposed in a portion where it can receive a +1st order diffraction ray of the first sub-beam from the polarization hologram, so as to detect a spherical aberration, the third light-receiving section is divided into two regions by a border extending in the radial direction, and is disposed in a portion where it can receive a +1st order diffraction ray of the second sub-beam from the polarization hologram, so as to detect a spherical aberration, and the second and third light-receiving sections are laid out such that an end of the second light-receiving section along the tangential direction and an opposite end of the third light-receiving section along the tangential direction are aligned on a straight line extending in the tangential direction across the first light-receiving section.

With this structure, the second light-receiving section is disposed out of alignment with respect to the first light-receiving section in the radial direction vertical to the tangential direction, and the third light-receiving section is disposed out of alignment with respect to the first light-receiving section in the direction opposite to the second light-receiving section (see the light-receiving sections PD5 to PD7 of FIG. 1). In this structure, the second light-receiving section receives a half of the +1st order diffraction ray identical in shape to the +1st order diffraction ray received by the first light-receiving section, while the third light-receiving section receives the other half. In this case, because of the shifting of the objective lens, the difference between the light detection signals of the two light-receiving sections is not 0 but identical to an error component (offset-signals) of the light detection signal (spherical aberration detection signal) of the first light-receiving section. Therefore, with the provision of the second and third light-receiving sections laid out in the foregoing manner, it becomes possible to correct the spherical aberration detection signal based on the difference between the light detection signals of the second and third light-receiving sections. Consequently, it becomes possible to detect spherical aberration signals without influence of offset-signals generated by the shifting of the objective lens in the radial direction.

In order to attain the foregoing object, a second spherical aberration detecting device according to the present invention comprises: a polarization hologram for diffracting a light beam reflected by an optical disk; and a photoreceiver for receiving a diffraction ray from the polarization hologram, the photoreceiver including a light-receiving section which is divided into four regions by a border extending in a radial direction and a border extending in a tangential direction.

With the foregoing structure in which the photoreceiver includes a light-receiving section divided into four regions, the light-receiving section is constituted of a combination of the first through third light-receiving sections of the first spherical aberration detecting device. With this structure, the second spherical aberration detecting device is capable of correcting spherical aberration detection signals as with the first spherical aberration detecting device. Consequently, it becomes possible to detect spherical aberration signals without influence of offset-signals generated by the shifting of the objective lens in the radial direction. Further, since the photoreceiver requires only a single light-receiving section for a spherical aberration, it has a simple structure. On this account, compensation of spherical aberration detection signals becomes possible without an increase in cost of the spherical aberration detecting device.

In order to attain the foregoing object, a third spherical aberration detecting device according to the present invention comprises: a polarization hologram for diffracting a light beam reflected by an optical disk; and a photoreceiver for receiving a diffraction ray from the polarization hologram, wherein: the photoreceiver includes the first to second light-receiving sections adjacently aligned in a tangential direction for respectively receiving a main beam and a sub-beam, the first light-receiving section is divided into two regions by a border extending in the radial direction, and is disposed in a portion where it can receive a +1st order diffraction ray of the main beam from the polarization hologram, and the second light-receiving section is divided into four regions by a border extending in the radial direction and a border extending in the tangential direction, and is disposed in a portion where it can receive a +1st order diffraction ray of the sub-beam from the polarization hologram.

With the foregoing structure in which the photoreceiver includes the second light-receiving section divided into four regions, the second light-receiving section is constituted of a combination of the second and third light-receiving sections of the first spherical aberration detecting device. With this structure, the third spherical aberration detecting device is capable of correcting spherical aberration detection signals as with the first spherical aberration detecting device. Consequently, it becomes possible to detect spherical aberration signals without influence of offset-signals generated by the shifting of the objective lens in the radial direction. Further, since the photoreceiver requires only two light-receiving sections for detecting a spherical aberration, it has a simple structure. On this account, compensation of spherical aberration detection signals becomes possible without an increase in cost of the spherical aberration detecting device.

Each of the optical pickup devices according to the present invention includes one of the spherical aberration detecting devices, and therefore obtains spherical aberration detection signals having been corrected to compensate offset-signals caused by the shifting of the objective lens. On this account, it is possible to accurately correct information signals read from the optical disk using the spherical aberration detection signals.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 12 is a plan view showing a structure of a photoreceiver in the optical pickup device of FIG. 11.

FIG. 14(a), 14(b) and 14(c) are plan views showing shapes of the optical light spots on the light-receiving sections for spherical aberration detection, respectively showing a state where negative spherical aberration is generated in the optical pickup device of FIG. 11, a state where positive spherical aberration is generated in the optical pickup device of FIG. 11, and a state where spherical aberration is not generated in the optical pickup device of FIG. 11.

FIGS. 15(a), 15(b) and 15(c) are plan views showing states of the light beam spots on the polarization holograms 3 in the optical pickup device of FIG. 11, each showing a state where an objective lens is shifted to the radial direction. FIG. 15(b) is a plan view showing a state of the light beam spot on the polarization holograms 3 in the optical pickup device of FIG. 11, showing a state where an objective lens is not shifted to the radial direction.

FIG. 16(b) is a plan view showing a shape of the diffraction ray on the light-receiving section for spherical aberration detection in the optical pickup device of FIG. 11, showing a state where an objective lens is not shifted to the radial direction.

DESCRIPTION OF THE EMBODIMENTS

First Embodiment

Figure 1:
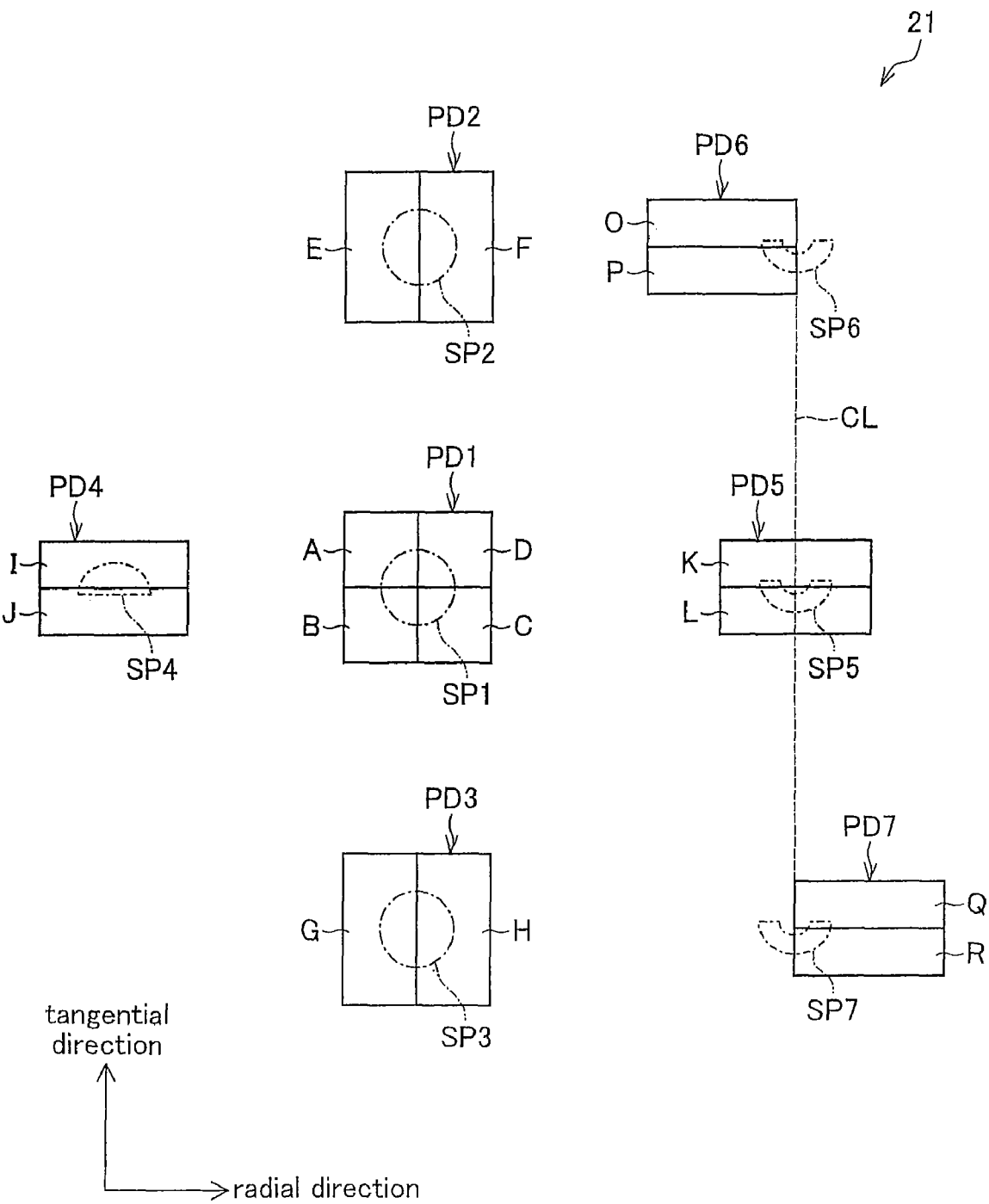
FIG. 1 is a plan view showing a structure of a photoreceiver in an optical pickup device according to First Embodiment of the present invention.
Figure 2:
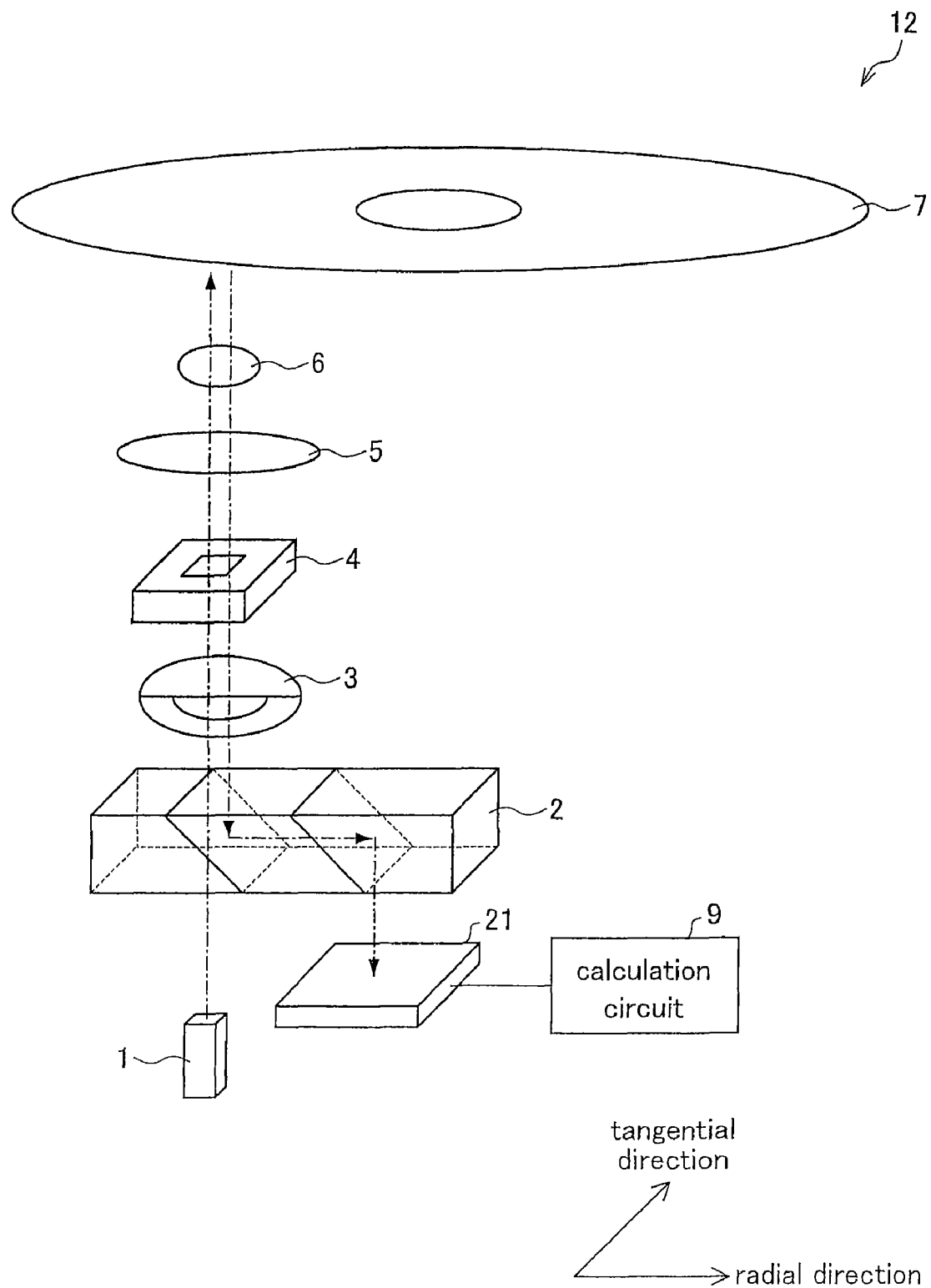
FIG. 2 is a perspective view showing a structure of the optical pickup device.

The following describes one embodiment of the present invention with reference to FIG. 1 to FIG. 7. FIG. 2 shows a structure of the optical pickup device 12 according to the present embodiment. FIG. 1 shows a structure of a photoreceiver 21 of the optical pickup device 12.

Figure 11:
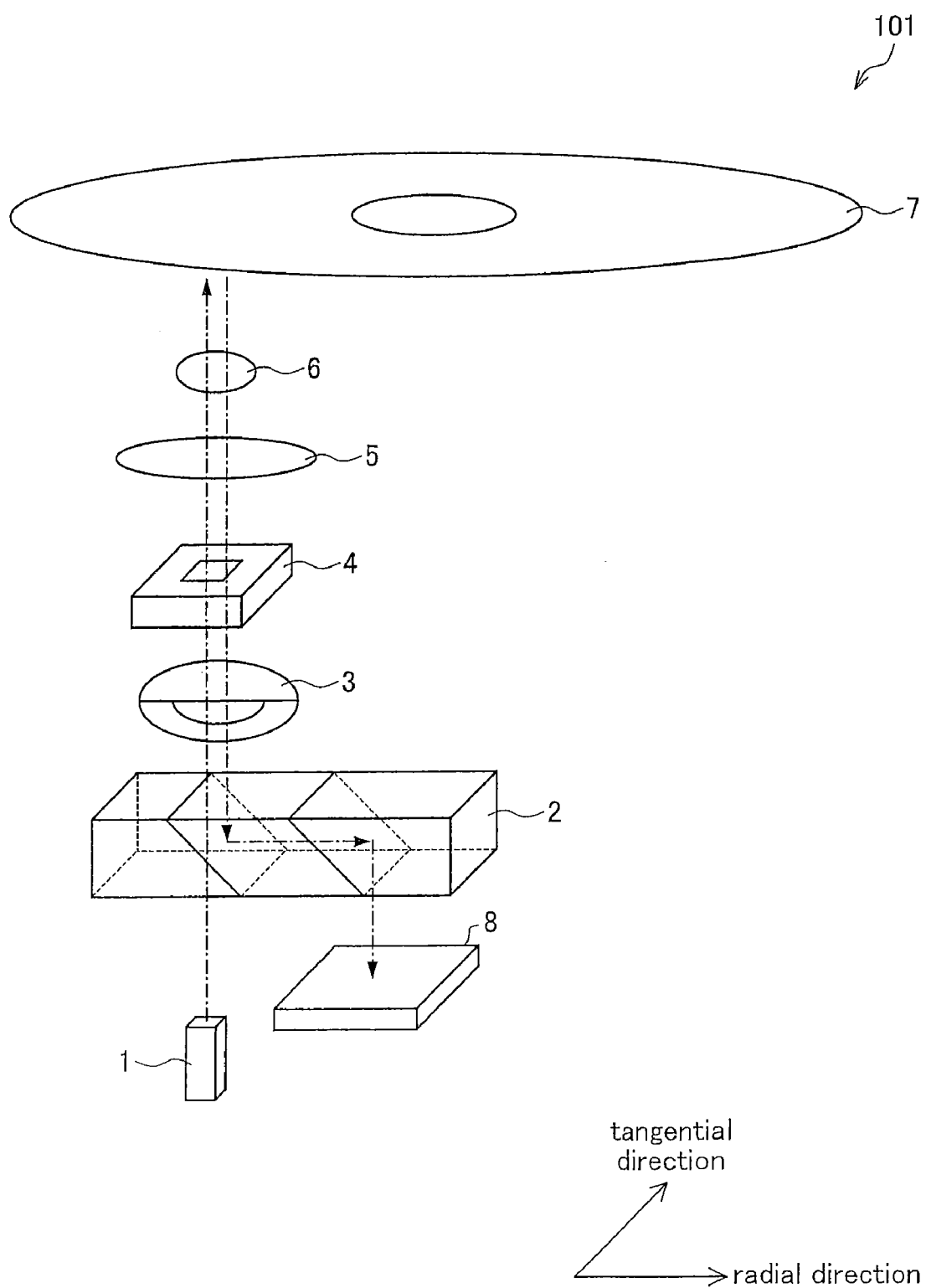
FIG. 11 is a perspective view showing a structure of a conventional optical pickup device.

As shown in FIG. 2, as with the conventional optical pickup device 101 of FIG. 11, the optical pickup device 12 includes the semiconductor laser 1, the beam splitter 2, the polarization hologram 3, the transmission grating 4, the collimator lens 5, and the objective lens 6. The photoreceiver 8 is replaced with a photoreceiver 21. This optical pickup device 12 further includes a calculation circuit 9 for calculating the SA signals (spherical aberration signals). As shown in FIG. 1, the photoreceiver 21 includes light-receiving sections PD6 and PD7, in addition to the light-receiving sections PD1 to PD5 of the photoreceiver 8 of the conventional optical pickup device 101 shown in FIG. 12.

The light-receiving section PD6 is provided to be adjacent to the light-receiving section PD2 in the radial direction with a predetermined interval. The PD7 is provided to be adjacent to the light-receiving section PD3 in the radial direction with a predetermined interval. The light-receiving section PD6 is placed with its right end (the end along the tangential direction) in line with the straight line CL (shown by a broken line of FIG. 1) extending in the tangential direction crossing the light-receiving section PD5. Further, the light-receiving section PD7 is placed with its left end (the other end along the tangential direction) in line with the straight line CL. The light-receiving section PD6 includes two photodiodes, one of which has a light-receiving region O while the other has a light-receiving region P. The shapes of these regions are identical in size, and each of them corresponds to a half of the light-receiving section PD6. The light-receiving section PD7 includes two photodiodes, one of which has a light-receiving region Q while the other has a light-receiving region R. The shapes of these regions are identical in size, and each of them corresponds to a half of the light-receiving section PD7. Further, the light-receiving sections PD5 to PD7 are laid out so that the interface between the light-receiving regions K and L, the interface between the light-receiving regions O and P, and the interface between the light-receiving regions Q and R extend in parallel in the radial direction.

Note that, the tangential direction designates a direction extending along the tangent line of the track of the optical disk 7, vertical to the radial direction.

With this structure, it becomes possible to detect spherical aberration signals without influence of the Sk–Sl offset signals. The following mainly explains a spherical aberration detection method using this layout pattern of the light-receiving sections O to R of the photoreceiver 21.

The light emitted from the semiconductor laser 1 serving as a light source passes through the beam splitter 2, and is incident on the polarization hologram 3. The incident light transmits through the polarization hologram 3, and is divided into three beams by a transmission grating 4 in a tangential direction, before being condensed onto the surface of the optical disk 7 by the collimator lens 5 and the objective lens 6. Passing through the collimator lens 5 and the objective lens 6, the reflection light from the optical disk 7 is again incident on the polarization hologram 3.

Figure 10:
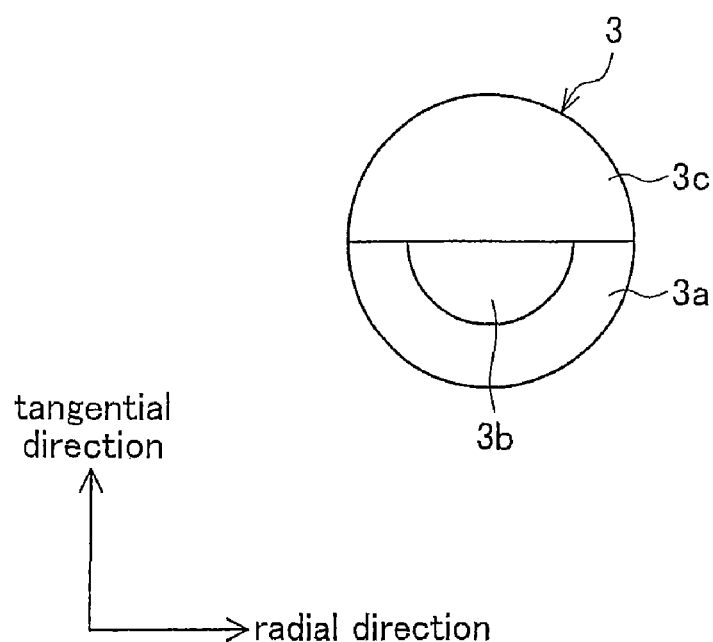
FIG. 10 is a plan view showing a structure of a common polarization hologram provided used for each of the optical pickup devices according to the respective embodiments of the present invention and for a conventional optical pickup device.

The polarizing directions of the light beams incident on the polarization hologram 3, i.e., the light from the light source and the reflection light of the optical disk 7 has a 90° difference which is given by a wavelength plate (not shown). As a result, the reflection light from the optical disk 7 is diffracted by the three regions 3a to 3c of the polarization hologram 3 shown in FIG. 10, and the resulting light beams are respectively focused onto the seven separate light-receiving sections PD1 to PD7 shown in FIG. 1.

Figure 13:
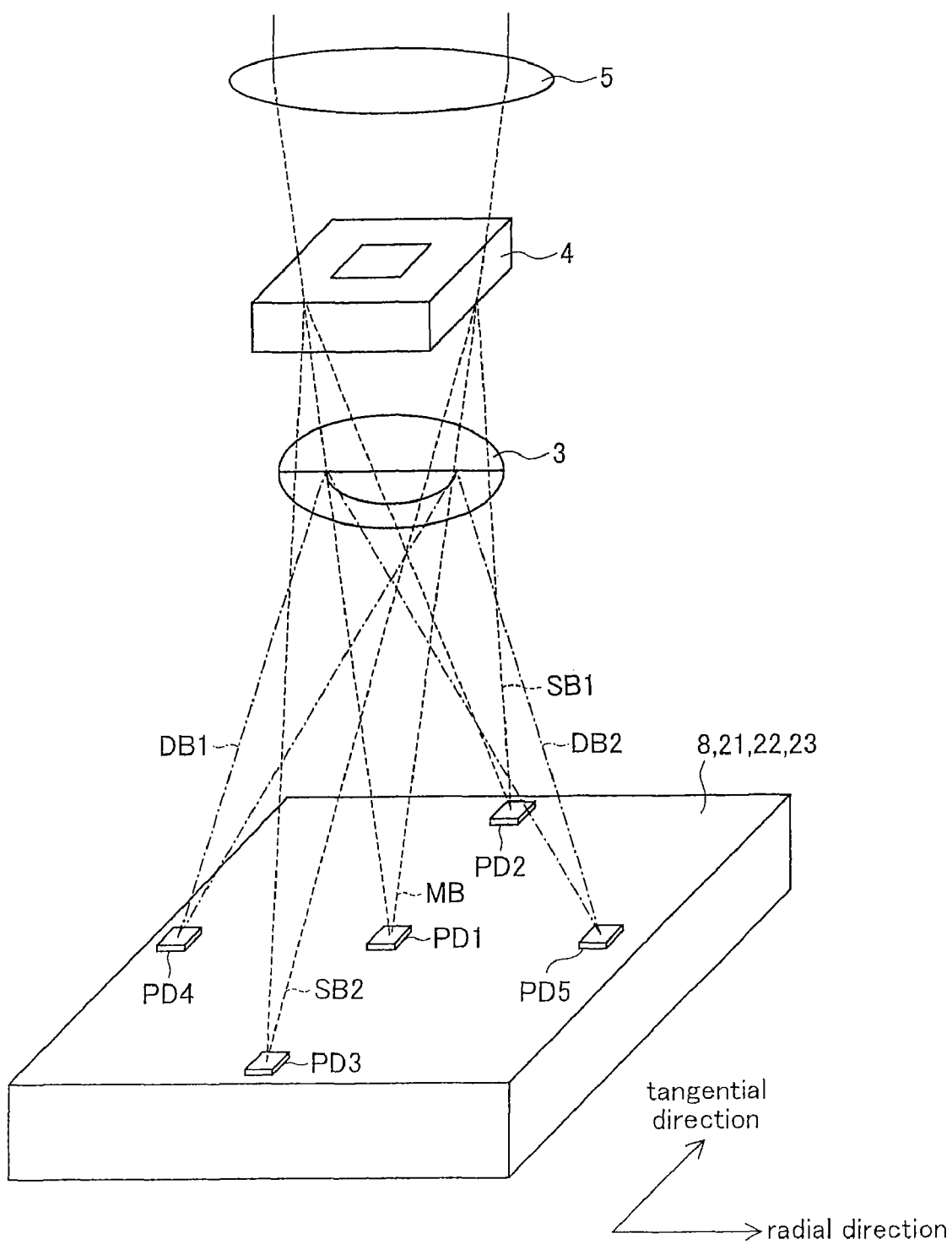
FIG. 13 is a perspective view showing a state of diffraction by the polarization hologram.
Figure 16:
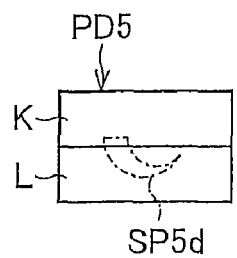
FIGS. 16(a), 16(b) and 16(c) are plan views showing shapes of the diffraction rays on the light-receiving sections for spherical aberration detection in the optical pickup device of FIG. 11, each showing a state where an objective lens is shifted to the radial direction.
Figure 16:
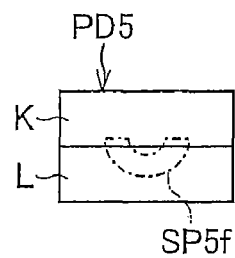
Figure 16:
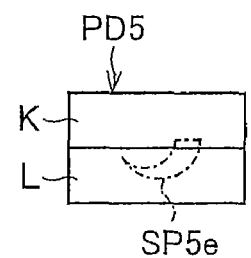

FIG. 1 shows the light-receiving sections PD1 to PD7 of the photoreceiver 21, and the shapes of light focused thereon. As shown in FIG. 13, the light-receiving section PD1 detects 0-th order diffraction ray of the main beam MB having been transmitted through the polarization hologram 3. The light-receiving sections PD2 and PD3 detect sub-beams SB1 and SB2, which are used for generation of tracking servo signals. The light-receiving section PD4 detects −1st order diffraction ray DB1 generated in the region 3c of the polarization hologram 3 used for detection of FES signals. The light-receiving section PD5 detects +1st order diffraction ray DB2 of the main beam MB generated in the regions 3a of the polarization hologram 3 used for detection of SA signals. In the light-receiving sections PD6 and PD7, the two sub-beams (first and second sub-beams) in the tangential direction generated in the transmission grating 4 detect two +1st order diffraction rays generated in the region 3a of the polarization hologram 3. The +1st order diffraction rays detected by the light-receiving sections PD6 and PD7 are used for offset detection of SA signals (offset-signals).

Figure 8:
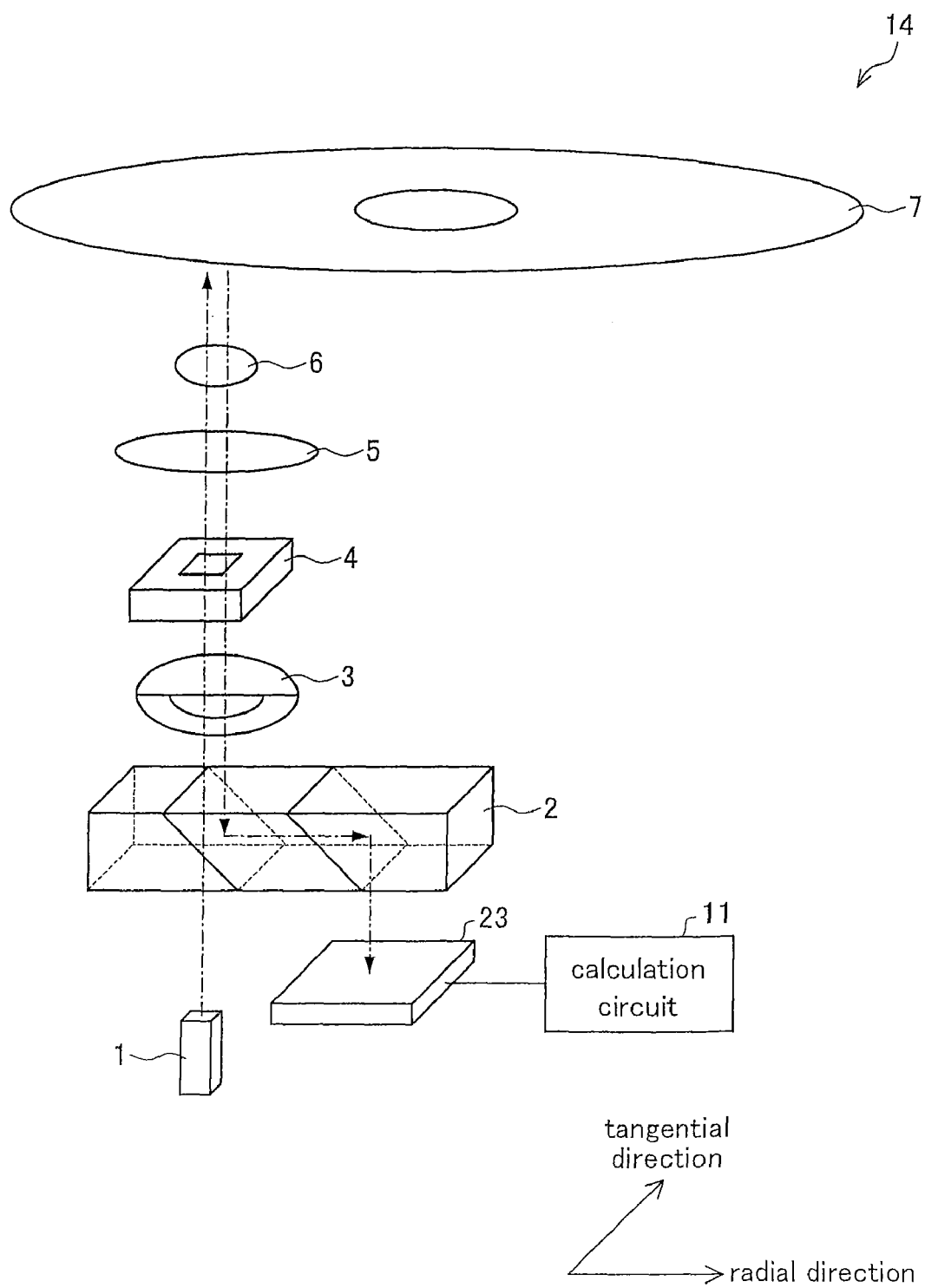
FIG. 8 is a perspective view showing a structure of an optical pickup device according to Third Embodiment of the present invention.

Note that, FIG. 1 shows only the +1st order diffraction ray as the light diffracted by the region 3a of FIG. 8, and shows only the −1st order diffraction ray as the light diffracted by the region 3c of FIG. 8. The light diffracted by the region 3b of the polarization hologram 3 is not discussed here, and therefore not shown in the figure.

When a spherical aberration occurs due to a thickness error of the optical disk 7, light spots SP5a to SP7a are formed on the light-receiving sections PD5 to PD7 as shown in FIG. 3(a), or light spots SP5b and SP7b are formed as shown in FIG. 3(b). Further, if a spherical aberration does not occur, light spots SP5c to SP7c are formed on the light-receiving sections PD5 to PD7 as shown in FIG. 3(c). Here, the difference Sk–Sl of the electric signals generated in the light-receiving regions K and L is calculated. According to the calculation, the signal of Sk–Sl becomes 0 when a spherical aberration does not occur, but the signal of Sk–Sl becomes either a positive value or a negative value when a spherical aberration occurs. In this way, a spherical aberration can be detected as a signal. Further, expressing the electric signals generated in the light-receiving region O, P, Q, R as So, Sp, Sq, Sr, respectively, signals of So–Sp and Sq–Sr are calculated. The calculation signals of So–Sp and Sq–Sr become 0 when a spherical aberration occurs, but the signals take either positive values or negative values when a spherical aberration does not occur.

The problem of prior art is generation of offset-signals of the Sk–Sl signals when the objective lens 6 following the track is shifted in the radial direction even though a spherical aberration does not occur. This is caused by associated shifting in the radial direction of the light spots formed by the reflection light of the optical disk 7 on the polarization hologram 3, which further causes a change in shape of light spots on the photoreceiver 8. The shapes of the light spots on the light-receiving sections K and L are changed in the radial direction by shifting of the objective lens 6. Similarly, shapes of the light spots on the light-receiving sections O and P and the light spots on the light-receiving sections Q and R are also changed in the radial direction. In view of this problem, the following describes detection of spherical aberration signals using signals So–Sp and Sq–Sr to eliminate influences of the offset-signals generated by the shifting of the objective lens 6.

The shifting of the objective lens 6 changes the shapes of the light spots on the photoreceiver 21. The offset-signals of the Sk–Sl signals generated by the changes of the light spot shapes are found by approximate calculation according to: Soff={(So−Sp)−(Sq−Sr)}. For example, FIG. 3(a) shows generation of a spherical aberration when the objective lens 6 is not shifted. Soff becomes 0 in this case. Similarly, Soff is 0 also in the case of FIG. 3(b).

When the objective lens 6 is shifted in the radial direction, the shapes of the light spots on the light-receiving section PD6 and the light-receiving section PD7 change in the radial direction, and Soff takes either a positive or a negative value. Soff is an offset-signal component derived from the shifting of the objective lens 6, and its sign changes depending on whether the objective lens 6 is shifted toward inner or outer periphery of the optical disk 7. For example, in FIG. 3(*a*), the light-receiving section PD6 and the light-receiving section PD7 are disposed such that they each receive a half of the light spot SP6*a* or SP7*a* identical in shape to the light spot SP5*a* formed almost on the light-receiving region K of the light-receiving section PD5. Further, in FIG. 3(*b*), the light-receiving section PD6 and the light-receiving section PD7 are disposed such that they each receive a half of the light spot SP6*b* or SP7*b* identical in shape to the light spot SP5*b* formed almost on the light-receiving region L of the light-receiving section PD5. Therefore, the magnitude relation of the (So–Sp) signal and (Sq–Sr) signal changes depending on the shifting direction of the objective lens 6, and therefore the calculation for their difference in the subtraction circuit 9*g* changes the sign of Soff depending on the shifting direction of the objective lens 6.

Figure 3:
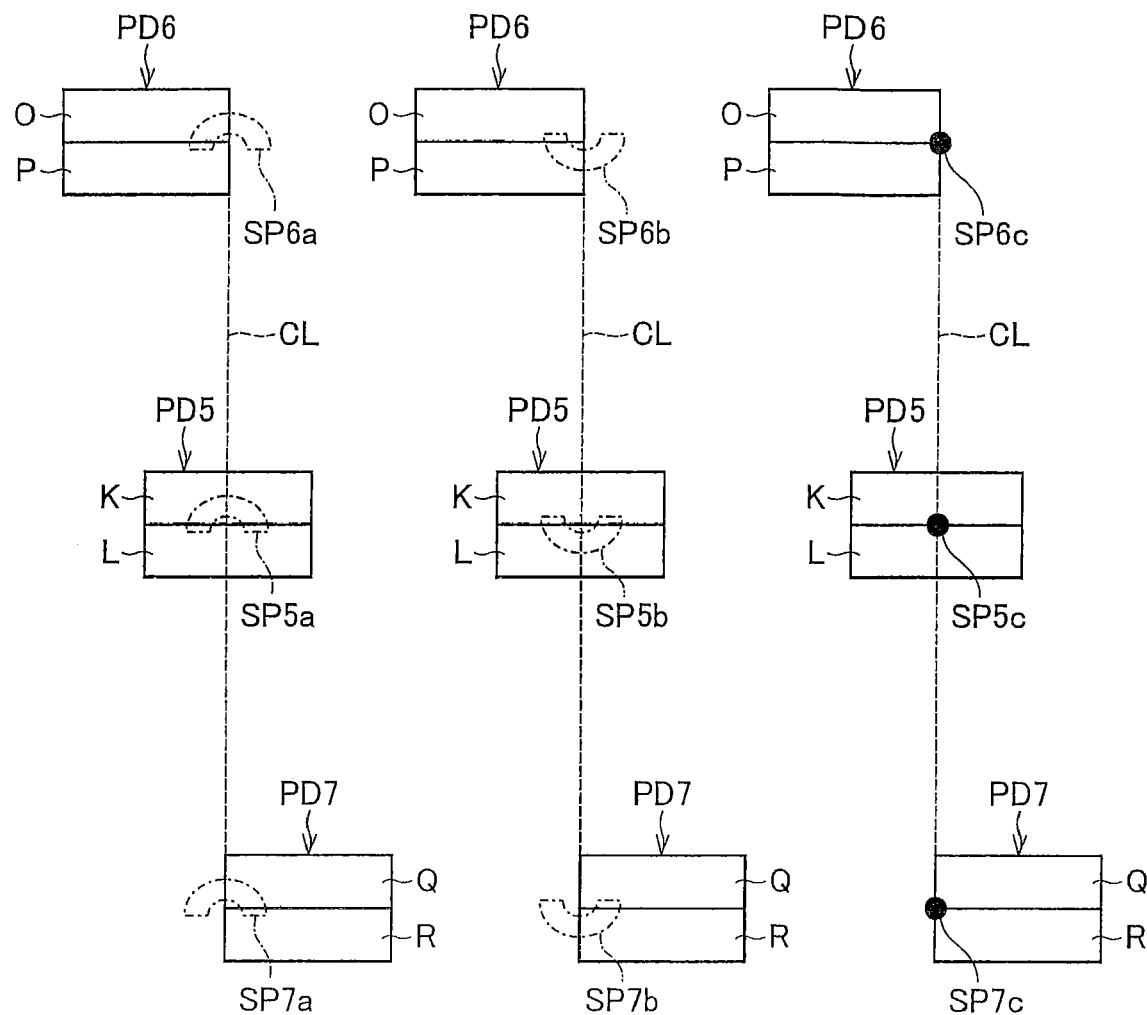
FIGS. 3(a), (b) and (c) are plan views showing shapes of the optical light spots on the light-receiving sections PD5 to PD7, respectively showing a state where negative spherical aberration is generated, a state where positive spherical aberration is generated, and a state where spherical aberration is not generated.

However, offset-signals of the Sk–Sl due to the shifting of the objective lens 6 are always same values regardless of the shifting direction of the objective lens 6, and therefore an absolute value of Soff needs to be added to the spherical aberration signals Sk–Sl. Further, as shown in FIGS. 3(*a*) and 3(*b*), the shapes of the light spots SP5*a* and SP5*b* on the light-receiving sections K and L change depending on whether the spherical aberration is a positive value or a negative value, and the sign of the Sk–Sl also changes. As a result, the Sk–Sl signal also takes an absolute value, and a spherical aberration signal SA is found by the following formula.

$$SA = |Sk - Sl| + |Soff| \quad (1)$$

$$= |Sk - Sl| + \alpha|(So - Sp) - (Sq - Sr)| \quad (2)$$

In the formula, α is a coefficient. Since the light spots on the light-receiving section PD6 and light-receiving section PD7 are both +1st order diffraction ray of the polarization hologram 3, which is a sub beam having a small light intensity, it is necessary to multiple the value by an appropriate coefficient for adjustment.

Figure 4:
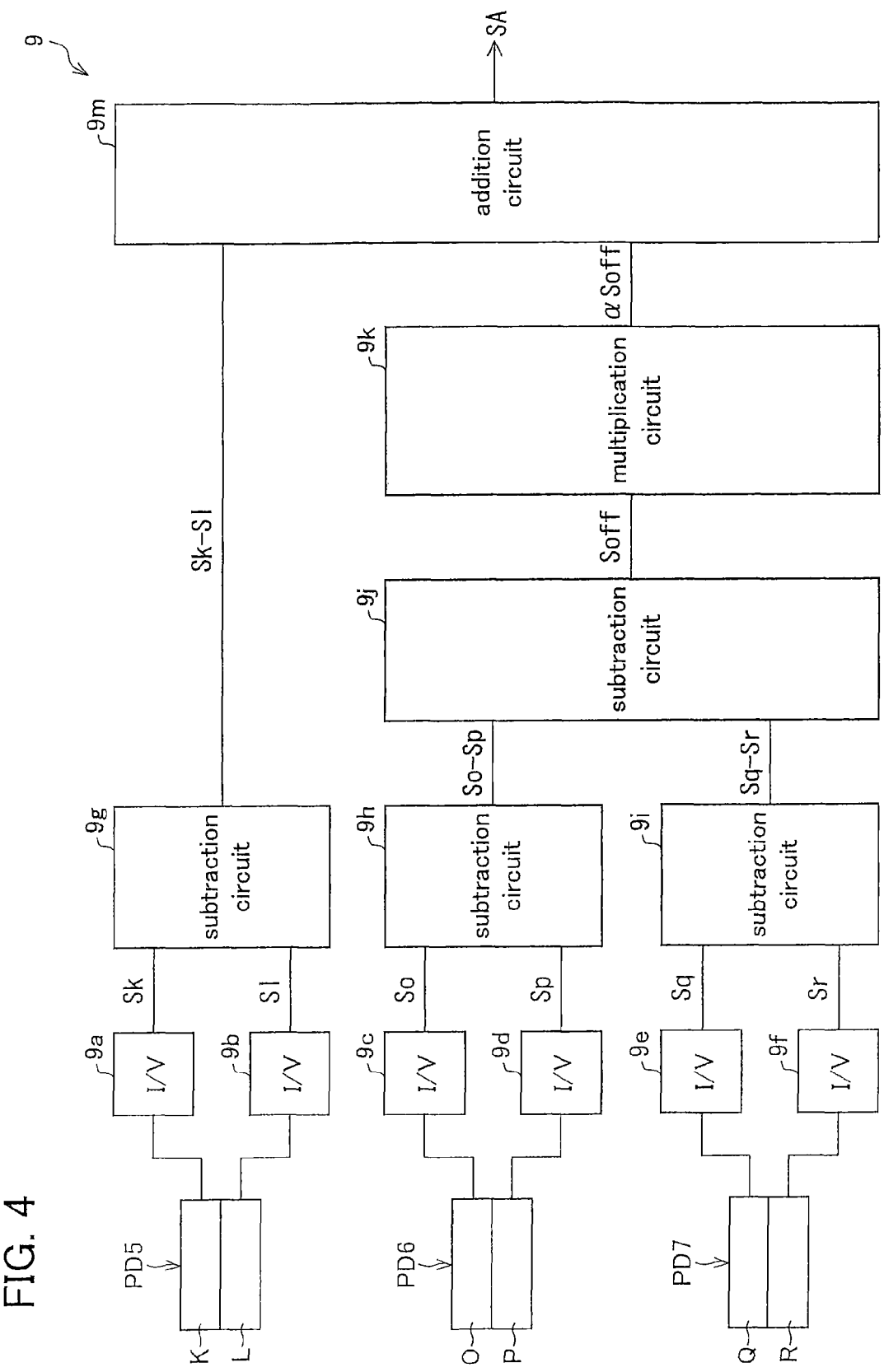
FIG. 4 is a block diagram showing a structure of a calculation circuit for calculation of spherical aberration signals in the optical pickup.

FIG. 4 shows a structure of a calculation circuit 9 for calculating SA signals. As shown in the figure, the calculation circuit 9 includes a current/voltage conversion circuits (shown as I/V in the figure) 9*a* to 9*f*, subtraction circuits 9*g* to 9*j*, a multiplication circuit 9*k* and an addition circuit 9*m*.

The current/voltage conversion circuits 9*a* to 9*f* serve to convert output signals (light-receiving signals) of the light-receiving regions K, L, O, P, Q, and R into voltage signals Sk, Sl, So, Sp, Sq, and Sr, respectively. The subtraction circuit 9*g* serves to subtract a signal Sl from a signal Sk, the subtraction circuit 9*h* serves to subtract a signal Sq from a signal So, and the subtraction circuit 9*i* serves to subtract a signal Sr from the signal Sq. The subtraction circuit 9*j* subtracts Sq–Sr outputted from the subtraction circuit 9*i* from So–Sp outputted from the subtraction circuit 9*h*, thereby outputting Soff. The multiplication circuit 9*k* serves to multiply the output of the subtraction circuit 9*j* by the coefficient α. The addition circuit 9*m* serves to add Sk–Sl outputted from the subtraction circuit 9*g* to αSoff outputted from the multiplication circuit 9*k*. The current/voltage conversion circuits 9*a* to 9*f*, the subtraction circuits 9*g* to 9*j*, the multiplication circuits 9*k* and addition circuit 9*m* are general analog circuits each mainly constituted of an operational amplifier, and therefore explanation of the details of these circuits is omitted here.

As described, the optical pickup device 12 includes the photoreceiver 21 including the light-receiving sections PD6 and PD7 disposed in the radial direction with respect to the light-receiving section PD5; and the offset calculation circuit 9. With this structure, the optical pickup device 12 is capable of calculating a SA signal which includes Soff found by the outputs of the light-receiving sections PD6 and PD7. In this way, the decrease of Sk–Sl is corrected by Soff even with the shifting of the objective lens 6, and therefore the influence of the shifting of the objective lens 6 to the SA signals can be greatly reduced.

Second Embodiment

Another embodiment of the present invention is described below with reference to FIG. 5 through FIG. 7. Note that, only the difference from First Embodiment is described in the following embodiment. For ease of explanation, materials having the equivalent functions as those shown in the drawings pertaining to the foregoing First Embodiment will be given the same reference symbols, and explanation thereof will be omitted here.

Figure 5:
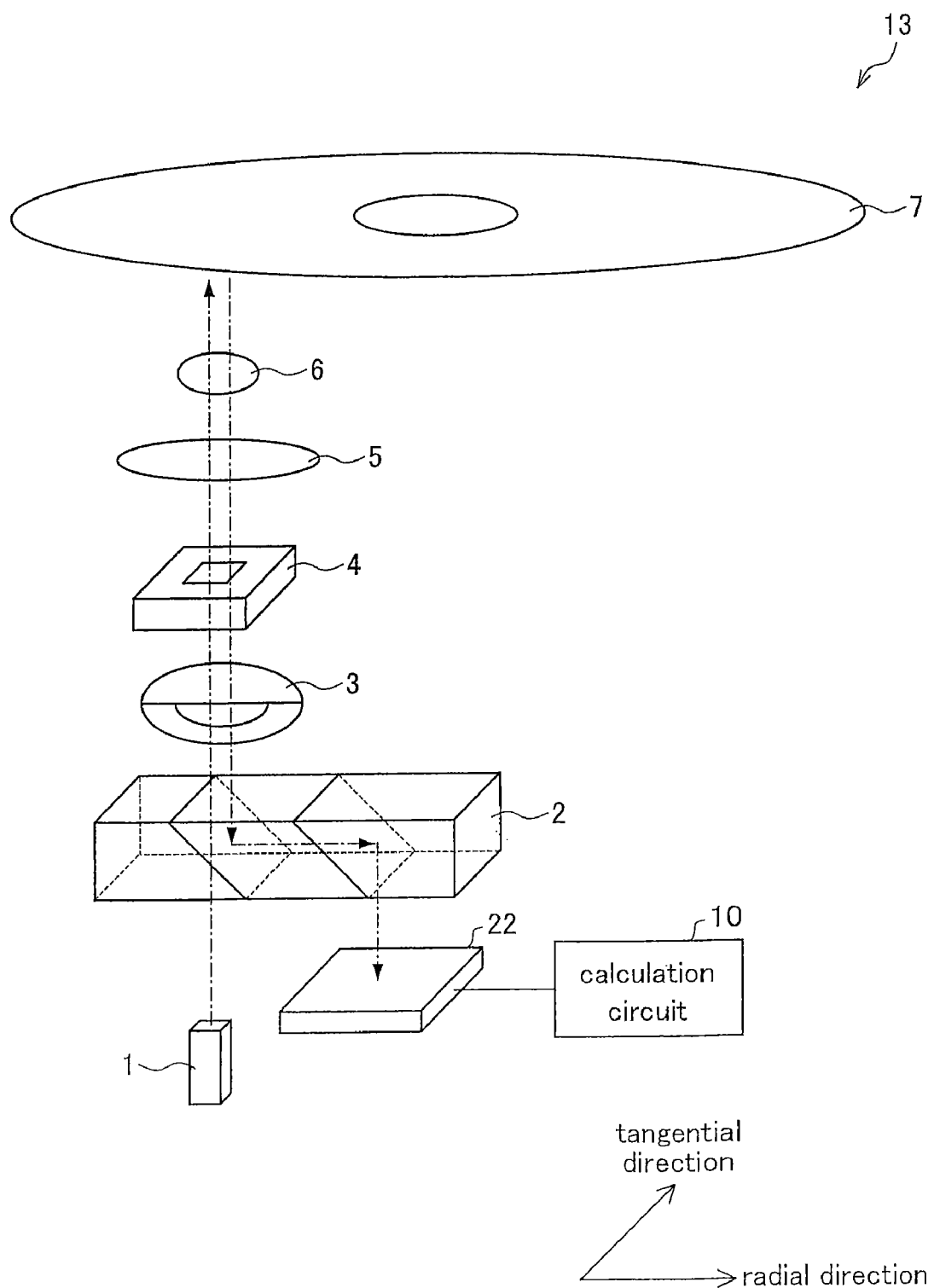
FIG. 5 is a perspective view showing a structure of an optical pickup device according to Second Embodiment of the present invention.
Figure 6:
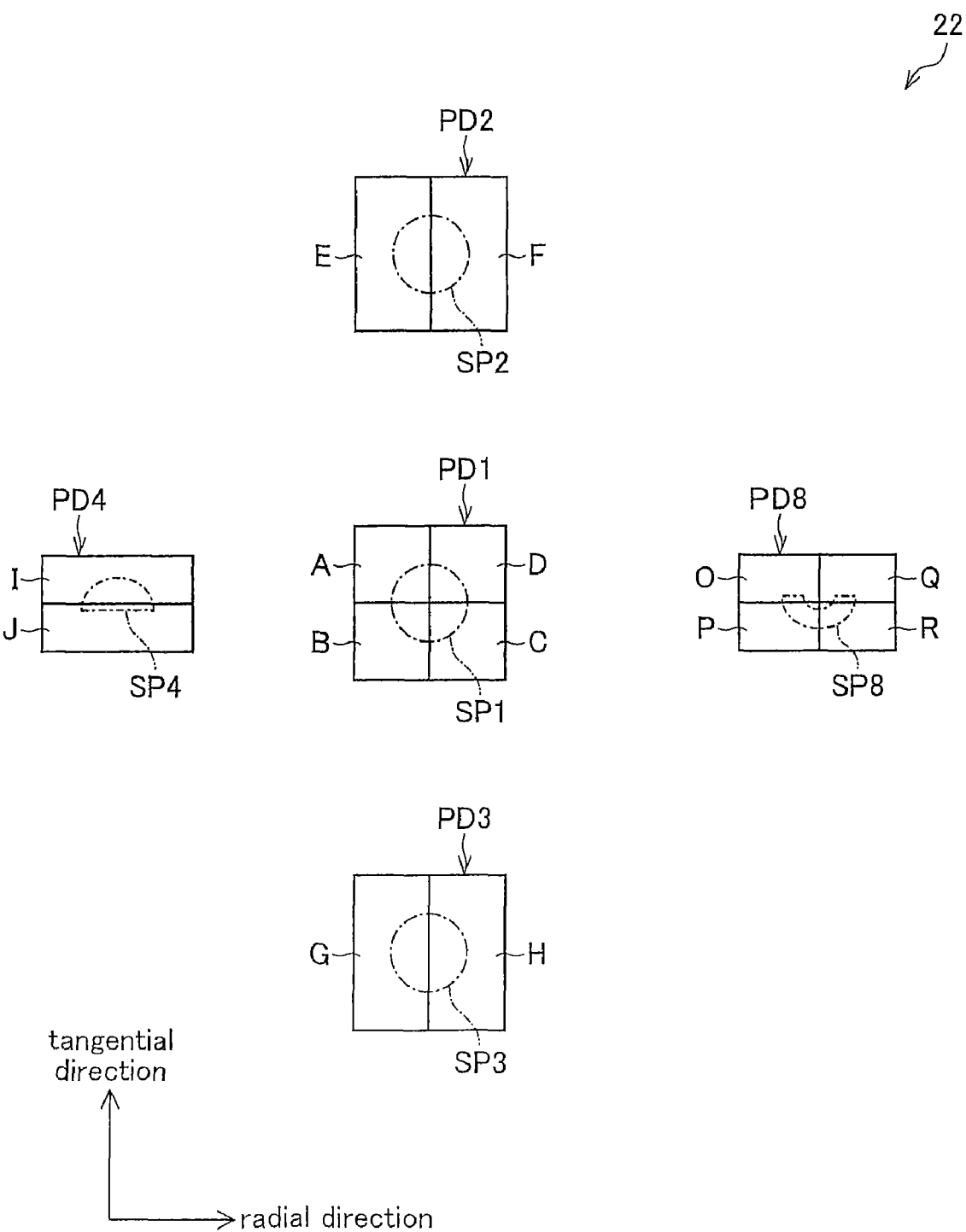
FIG. 6 is a plan view showing a structure of a photoreceiver in the optical pickup device of FIG. 5.

FIG. 5 shows a structure of an optical pickup device 13 according to the present embodiment. FIG. 6 shows a structure of a photoreceiver 22 of the optical pickup device 13.

As shown in FIG. 5, as with the optical pickup device 12 of First Embodiment shown in FIG. 1, the optical pickup device 13 includes the semiconductor laser 1, the beam splitter 2, the polarization hologram 3, the transmission grating 4, the collimator lens 5, and the objective lens 6. The photoreceiver 21 is replaced with a photoreceiver 22. The calculation circuit 9 is replaced with a calculation circuit 10. As shown in FIG. 6, the photoreceiver 22 includes the light-receiving sections PD1 to PD4 as with the photoreceiver 8 of the conventional optical pickup device 101 shown in FIG. 12. The light-receiving section PD5 is replaced with a light-receiving section PD8.

The light-receiving section PD8 has four-divisional light-receiving regions O, P, Q, and R. In the light-receiving section PD8, the light-receiving regions O and P of the light-receiving section PD6 of First Embodiment, and the light-receiving regions Q and R of the light-receiving section PD7 of First Embodiment are combined. The light-receiving regions O and Q are aligned in the radial direction, and the light-receiving regions P and R are aligned in the radial direction. Further, the light-receiving regions O and P are aligned in the tangential direction, and the light-receiving sections Q and R are aligned in the tangential direction.

Assuming that the electronic signals generated in the four light-receiving regions O, P, Q, and R are expressed as So, Sp, Sq, and Sr, the Sk and Sl are expressed as follows.

$$Sk = So + Sq \quad (3)$$

$$Sl = Sp + Sr \quad (4)$$

With this calculation, in addition to the prior art, the +1st order diffraction ray of the main beam generated in the region 3*a* of the polarization hologram 3 is focused onto the light-receiving section PD8 as a light spot SP8, and is detected in the light-receiving regions O, P, Q, and R in the light-receiving section PD8. It is thus possible to detect spherical aberration signals without influence of the offset signals due to shifting of the objective lens 6.

The spherical aberration detection method using the layout pattern of the photoreceiver 22 according to the present embodiment differs from the spherical aberration detection method using the layout pattern of the photoreceiver 21 according to First Embodiment only in the layout and pattern of the photoreceiver 22 and the way of calculation in the detection of spherical aberration signals. Therefore, the following describes only the difference.

The light-receiving signal So of the spherical aberration detection method using the layout pattern of the photoreceiver 21 according to First Embodiment differs from the light-receiving signal So of the spherical aberration detection method using the layout pattern of the photoreceiver 22 according to the present embodiment in its output due to the difference between the sub-beam and the main-beam. However, the shape of light spot to be detected is identical. The same can be said for the signals Sp, Sq, and Sr. Therefore, in the calculation formula of the spherical aberration detection of the present embodiment, the following formulas (3) and (4) are substituted into the calculation formula according to the spherical aberration detection method of First Embodiment using the layout pattern of the photoreceiver 21, as shown below.

$$SA = |Sk - Sl| + |Soff| \quad (5)$$

$$= |(So + Sq) - (Sp + Sr)| + |(So - Sp) - (Sq - Sr)| \quad (6)$$

Since the signal of the main beam is used for Soff, the correction coefficient α is not necessary.

Figure 7:
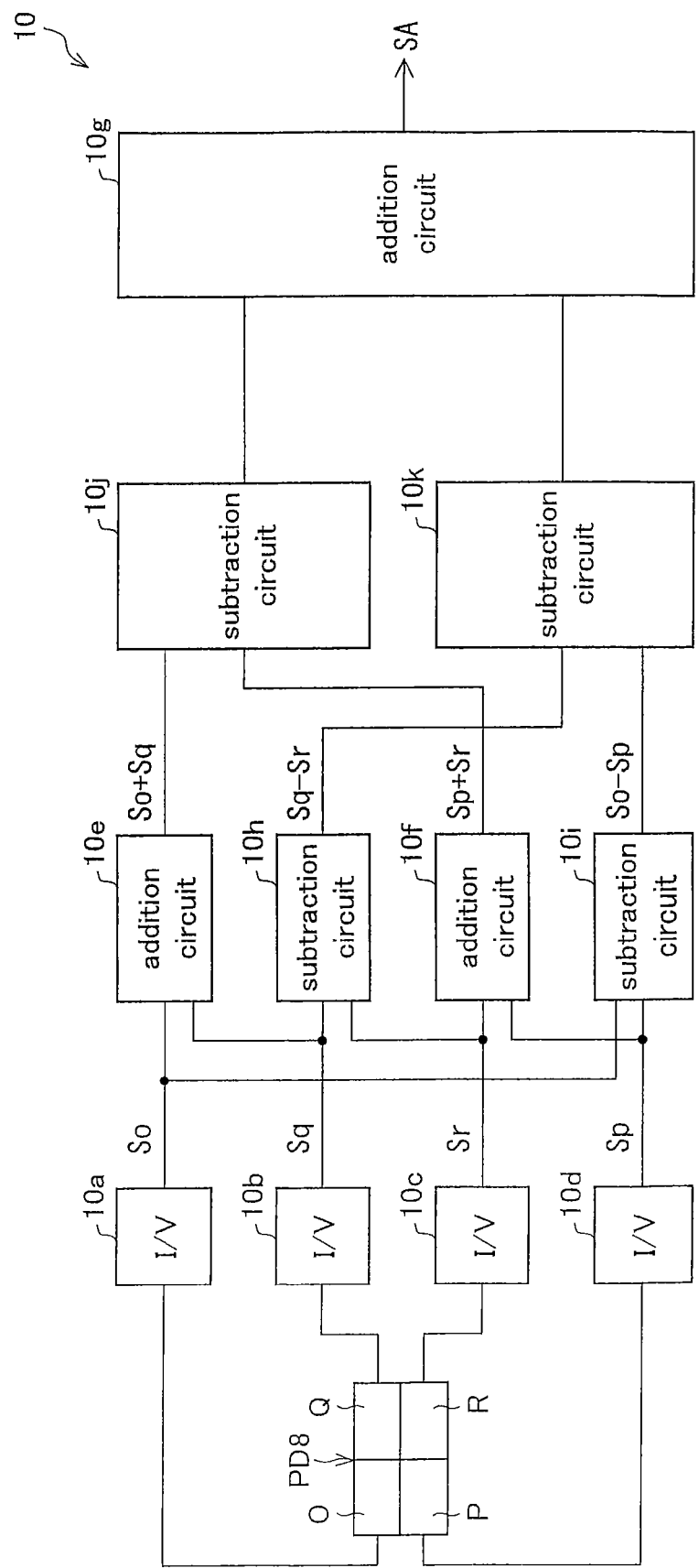
FIG. 7 is a block diagram showing a structure of a calculation circuit for calculation of spherical aberration signals in the optical pickup device of FIG. 5.

FIG. 7 shows a structure of the calculation circuit 10 for calculating the SA signals. As shown in FIG. 7, the calculation circuit 10 includes current/voltage conversion circuits (denoted by "I/V" in the figure) 10a to 10d, addition circuits 10e to 10g, and subtraction circuits 10h to 10k.

The current/voltage conversion circuits 10a to 10d are circuits for converting respective output currents (light-receiving currents) of the light-receiving regions O, P, Q, and R into voltage signals So, Sp, Sq, and Sr. The addition circuit 10e adds signals So and Sq, and the addition circuit 10f adds signals Sp and Sr. The subtraction circuit 10h subtracts a signal Sr from a signal Sq, and the subtraction circuit 10i subtracts a signal Sp from So. The subtraction circuit 10j subtracts Sp+Sr outputted from the addition circuit 10f from So+Sq outputted from the addition circuit 10e. The subtraction circuit 10k subtracts So−Sp outputted from the subtraction circuit 10i from Sq−Sr outputted from the subtraction circuit 10h. The addition circuit 10m outputs a SA signal, after adding the outputs of the subtraction circuits 10j and 10k thereto.

Since each of the current/voltage conversion circuits 10a to 10d, the addition circuits 10e to 10g and the subtraction circuits 10h to 10k are general analog circuits each mainly constituted of an operational amplifier, explanation of the details of these circuits is omitted here.

As described, the optical pickup device 13 includes the photoreceiver 22 including the light-receiving section PD8 having four light-receiving regions O, P, Q and R; and the calculation circuit 10. With this structure, the optical pickup device 13 is capable of calculating SA signals including Soff. In this way, the decrease of Sk−Sl is corrected by Soff even with the shifting of the objective lens 6, and therefore the influence of the shifting of the objective lens 6 to the SA signals can be greatly reduced. Further, since the photoreceiver 22 requires only a single light-receiving section PD8 for detecting SA signals, it has a simpler structure than the photoreceiver 21 of First Embodiment. On this account, compensation of offset of SA signals becomes possible without an increase in cost of the optical pickup device 13.

Third Embodiment

Another embodiment of the present invention is described below with reference to FIG. 8 and FIG. 9. Note that, only the difference from First Embodiment is described in the following embodiment. For ease of explanation, materials having the equivalent functions as those shown in the drawings pertaining to the foregoing First and Second Embodiments will be given the same reference symbols, and explanation thereof will be omitted here.

FIG. 8 shows a structure of an optical pickup device 14 according to the present embodiment. FIG. 9 shows a structure of a photoreceiver 23 of the optical pickup device 14.

As shown in FIG. 8, as with the optical pickup device 12 of First Embodiment shown in FIG. 1, the optical pickup device 14 includes the semiconductor laser 1, the beam splitter 2, the polarization hologram 3, the transmission grating 4, the collimator lens 5, and the objective lens 6. The photoreceiver 21 is replaced with the photoreceiver 22. The calculation circuit 9 is replaced with a calculation circuit 11.

Figure 9:
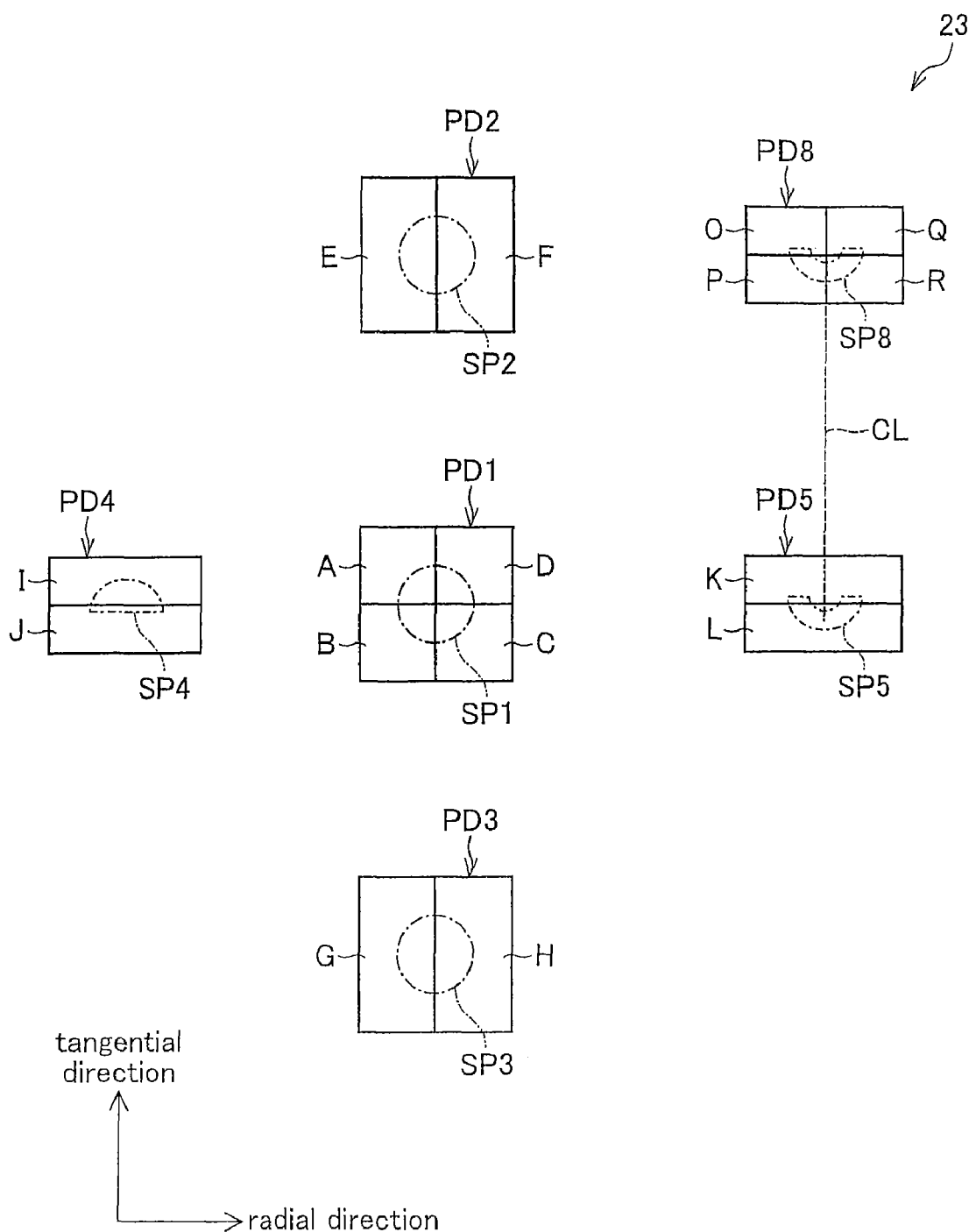
FIG. 9 is a plan view showing a structure of a photoreceiver in the optical pickup device of FIG. 8.

As shown in FIG. 9, the photoreceiver 23 includes the light-receiving sections PD1 to PD5, as with the photoreceiver 8 of the optical pickup 101 shown in FIG. 12, but further includes a light-receiving section PD8. The light-receiving section PD8 is provided to be adjacent to the light-receiving section PD5 in the tangential direction with a predetermined interval. The light-receiving section PD8 is also disposed to be adjacent to the light-receiving section PD2 in the radial direction with a predetermined interval. More specifically, the light-receiving section PD8 is disposed with its center in the tangential direction concentric to the center of the light-receiving section PD5 in the tangential direction on a same straight line (shown by a broken line of FIG. 9).

In such an optical pickup device 14, detection of a spherical aberration is carried out using a sub-beam SB1 and a main beam MB in the tangential direction generated in the transmission grating 4, as shown in FIG. 13. The +1st order diffraction rays of the sub-beam SB1 generated in the polarization hologram 3 are received by the four divided light-receiving regions O, P, Q and R shown in FIG. 7, and the +1st order diffraction ray of the main beam MB is received by the two-divided light-receiving regions K and L, so as to detect spherical aberration signals.

The spherical aberration detection method according to the present embodiment differs from the spherical aberration detection method using the layout pattern of the photoreceiver 21 according to First Embodiment only in the layout and pattern of the photoreceiver and the way of calculation in the detection of spherical aberration signals. Therefore, the following describes only the difference.

The light-receiving signal So of the spherical aberration detection method using the layout pattern of the photoreceiver 21 according to First Embodiment and the light-receiving signal So of the spherical aberration detection method using the layout pattern of the photoreceiver 23 according to the present embodiment are identical in shape of the light spot to be detected. The same can be said for the signal Sp. As to the signals Sq and Sr, there is a difference between the sub-beam SB1 and the main-beam SB2, but the shape of light spot to be detected is identical. Therefore, the calculation formula for detection is the same as that of the spherical aberration detection according to First Embodiment using the layout pattern of the photoreceiver 21, as shown below.

$$SA = |Sk - S1| + \alpha|Soff| \quad (7)$$

$$= |Sk - S1| + \alpha|(So - Sp) - (Sq - Sr)| \quad (8)$$

In this manner, the calculation of SA signals can be performed by a calculation circuit 11 having the same structure as that of the calculation circuit 9. Therefore, the calculation circuit 11 is not shown in the figure.

In the formula, $\alpha$ is a coefficient. Since the light spots on the light-receiving regions O, P, Q and R are +1st order diffraction rays of the sub beam SB1 generated in the polarization hologram 3, the light intensity is small. Therefore, it is necessary to multiple the value by an appropriate coefficient for adjustment.

As described, the optical pickup device 14 includes the photoreceiver 23 including the light-receiving section PD5 and the light-receiving section PD8 having four light-receiving regions O, P, Q and R; and the calculation circuit 11. With this structure, the optical pickup device 14 is capable of calculating SA signals including Soff found from the output of the light-receiving section PD8. In this way, the decrease of Sk–Sl is corrected by Soff even with the shifting of the objective lens 6, and therefore the influence of the shifting of the objective lens 6 to the SA signals can be greatly reduced. Further, since the photoreceiver 23 requires only two single light-receiving sections PD5 and PD8 for detecting SA signals, it has a simpler structure than the photoreceiver 21 of First Embodiment. On this account, compensation of offset of SA signals becomes possible without an increase in cost of the optical pickup device 14.

Summary of Embodiments

As described, a first spherical aberration detecting device according to the present invention comprises: a transmission grating 4 for dividing, in a tangential direction, a light beam emitted from a semiconductor laser 1 into a main beam, a first sub-beam and a second sub-beam; a collimator lens 5 and an objective lens 6 for focusing the three beams on an optical disk 7; a polarization hologram 3 for diffracting a light beam reflected by the optical disk 7; and a photoreceiver 21 for receiving a diffraction ray from the polarization hologram 3, wherein: the photoreceiver 21 includes the light-receiving sections PD5 to PD7 adjacently aligned for respectively receiving +1st order diffraction rays of the main beam, the first sub-beam and the second sub-beam generated in the polarization hologram 3, the light-receiving section PD5 is divided into two regions by a border extending in a radial direction, and is disposed in a portion where it can receive a +1st order diffraction ray of the main beam from the polarization hologram 3, so as to detect a spherical aberration, the light-receiving section PD6 is divided into two regions by a border extending in the radial direction, and is disposed in a portion where it can receive a +1st order diffraction ray of the first sub-beam from the polarization hologram 3, so as to detect a spherical aberration, the light-receiving section PD7 is divided into two regions by a border extending in the radial direction, and is disposed in a portion where it can receive a +1st order diffraction ray of the second sub-beam from the polarization hologram 3, so as to detect a spherical aberration, and the light-receiving sections PD6 and PD7 are laid out such that an end of the light-receiving section PD6 along the tangential direction and an opposite end of the light-receiving section PD7 along the tangential direction are aligned on a straight line extending in the tangential direction across the light-receiving section PD5.

With this structure, the light-receiving section PD6 is disposed out of alignment with respect to the light-receiving section PD5 in the radial direction vertical to the tangential direction, and the light-receiving section PD7 is disposed out of alignment with respect to the light-receiving section PD5 in the direction opposite to the light-receiving section PD6 (see the light-receiving sections PD5 to PD7 of FIG. 1). In this structure, the light-receiving section PD6 receives a half of the +1st order diffraction ray identical in shape to the +1st order diffraction ray received by the light-receiving section PD5, while the light-receiving section PD7 receives the other half. In this case, because of the shifting of the objective lens, the difference between the light detection signals of the two light-receiving sections is not 0 but identical to an error component (offset-signals) of the light detection signal (spherical aberration detection signal) of the light-receiving section PD5. Therefore, with the provision of the light-receiving sections PD6 and PD7 laid out in the foregoing manner, it becomes possible to correct the spherical aberration detection signal based on the difference between the light detection signals of the light-receiving sections PD6 and PD7. Consequently, it becomes possible to detect spherical aberration signals without influence of offset-signals generated by the shifting of the objective lens in the radial direction.

The first spherical aberration detecting device is preferably arranged so that the polarization hologram 3 includes a region 3a surrounded by a straight line in the radial direction orthogonal to an optical axis of the light beam, a first semicircle, and a second semicircle which is concentric to a first semicircle and smaller in radius than the first semicircle, the region 3a emitting the +1st order diffraction rays of the main beam, the first sub-beam and the second sub-beam. In this way, it becomes possible to detect a highly-accurate spherical aberration without influence of the shifting of the objective lens.

Further, the first spherical aberration detecting device preferably further comprises: a subtraction circuit 9g for calculating a difference between light detection signals outputted from the two light-receiving regions K and L constituting the light-receiving section PD5; a subtraction circuit 9h for calculating a difference between light detection signals outputted from the two light-receiving regions O and P constituting the light-receiving section PD6; a subtraction circuit 9i for calculating a difference between light detection signals outputted from the two light-receiving regions Q and R constituting the light-receiving section PD7; a subtraction circuit 9j for calculating a difference between an output of the subtraction circuit 9h and an output of the subtraction circuit 9i; and an addition circuit 9m for calculating a sum of an output of the subtraction circuit 9g and an output of the subtraction circuit 9j. With this structure, it becomes possible to calculate spherical aberration signals immune to offset-signals.

A second spherical aberration detecting device according to the present invention comprises: a polarization hologram 3 for diffracting a light beam reflected by an optical disk 7; and a photoreceiver 22 for receiving a diffraction ray from the polarization hologram 3, the photoreceiver 22 including a light-receiving section which is divided into four regions by a border extending in a radial direction and a border extending in a tangential direction.

With the foregoing structure in which the photoreceiver 22 includes a light-receiving section PD8 divided into four regions, the light-receiving section PD8 is constituted of a combination of the light-receiving sections PD5 to PD7 of the first spherical aberration detecting device. With this structure, the second spherical aberration detecting device is capable of correcting spherical aberration detection signals as with the first spherical aberration detecting device. Consequently, it becomes possible to detect spherical aberration signals without influence of offset-signals generated by the shifting of the objective lens in the radial direction. Further, since the photoreceiver 22 requires only a single light-receiving section PD8 for a spherical aberration, it has a simple structure. On this account, compensation of spherical aberration detection signals becomes possible without an increase in cost of the spherical aberration detecting device.

Further, the second spherical aberration detecting device is preferably arranged so that the polarization hologram 3 includes a region 3a surrounded by a straight line in the radial direction orthogonal to an optical axis of the light beam, a first semicircle, and a second semicircle which is concentric to a first semicircle and smaller in radius than the first semicircle, the region 3a emitting the diffraction rays to the light-receiving section PD8. In this way, it becomes possible to detect a highly-accurate spherical aberration.

The second spherical aberration detecting device according to the present invention preferably further comprises: an addition circuit 10e for calculating a sum of a light detection signal outputted from the light-receiving region O and a light detection signal outputted from the light-receiving region Q; an addition circuit 10f for calculating a sum of a light detection signal outputted from the light-receiving region P and a light detection signal outputted from the light-receiving region R; a subtraction circuit 10h for calculating a difference between the light detection signal outputted from the light-receiving region Q and the light detection signal outputted from the light-receiving region R; a subtraction circuit 10i for calculating a difference between the light detection signal outputted from the light-receiving region O and the light detection signal outputted from the light-receiving region P; a subtraction circuit 10j for calculating a difference between an output of the addition circuit 10e and an output of the addition circuit 10f; a subtraction circuit 10k for calculating a difference between an output of the subtraction circuit 10h and an output of the subtraction circuit 10i; and an addition circuit 10g for calculating a sum of the addition circuits 10j and 10k. With this structure, it becomes possible to calculate spherical aberration signals immune to offset-signals.

A third spherical aberration detecting device according to the present invention comprises:

a polarization hologram 3 for diffracting a light beam reflected by an optical disk 7; and a photoreceiver 23 for receiving a diffraction ray from the polarization hologram 3, wherein: the photoreceiver 23 includes light-receiving sections PD5 and PD8 adjacently aligned in a tangential direction for respectively receiving a main beam and a sub-beam, the light-receiving section PD5 is divided into two regions by a border extending in the radial direction, and is disposed in a portion where it can receive a +1st order diffraction ray of the main beam from the polarization hologram 3, and the light-receiving section PD8 is divided into four regions by a border extending in the radial direction and a border extending in the tangential direction, and is disposed in a portion where it can receive a +1st order diffraction ray of the sub-beam from the polarization hologram 3.

With the foregoing structure in which the photoreceiver 23 includes a light-receiving section PD8 divided into four regions, the light-receiving section PD8 is constituted of a combination of the light-receiving sections PD6 and PD7 of the first spherical aberration detecting device. With this structure, the third spherical aberration detecting device is capable of correcting spherical aberration detection signals as with the first spherical aberration detecting device. Consequently, it becomes possible to detect spherical aberration signals without influence of offset-signals generated by the shifting of the objective lens in the radial direction. Further, since the photoreceiver 23 requires only two light-receiving sections PD5 and PD8 for detecting a spherical aberration, it has a simple structure. On this account, compensation of spherical aberration detection signals becomes possible without an increase in cost of the spherical aberration detecting device.

Further, the third spherical aberration detecting device is preferably arranged so that the polarization hologram 3 includes a region 3a surrounded by a straight line in the radial direction orthogonal to an optical axis of the light beam, a first semicircle, and a second semicircle which is concentric to a first semicircle and smaller in radius than the first semicircle, the region 3a emitting the +1st order diffraction rays of the main beam, the sub-beams. In this way, it becomes possible to detect a highly-accurate spherical aberration.

Further, the third spherical aberration detecting device preferably further comprises: a subtraction circuit 9g for calculating a difference between light detection signals outputted from the two light-receiving regions K and L constituting the light-receiving section PD5; a subtraction circuit 9h for calculating a difference between light detection signals outputted from the light-receiving regions O and P; a subtraction circuit 9i for calculating a difference between light detection signals outputted from the light-receiving regions Q and R, a subtraction circuit 9j for calculating a difference between an output of the subtraction circuit 9h and an output of the subtraction circuit 9i; and an addition circuit 9m for calculating a sum of an output of the subtraction circuit 9g and an output of the subtraction circuit 9i. With this structure, it becomes possible to calculate spherical aberration signals immune to offset-signals.

Each of the optical pickup devices 12 to 14 according to the present embodiment includes one of the spherical aberration detecting devices, and therefore obtains spherical aberration detection signals having been corrected to compensate offset-signals caused by the shifting of the objective lens. On this account, it is possible to accurately correct information signals read from the optical disk 7 using the spherical aberration detection signals.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A spherical aberration detecting device, comprising: a transmission grating for dividing, in a tangential direction, a light beam emitted from a light source into a main beam, a first sub-beam and a second sub-beam; an optical element for focusing the three beams on an optical disk; a polarization hologram for diffracting a light beam reflected by the optical disk; and a photoreceiver for receiving a diffraction ray from the polarization hologram,
wherein:
the photoreceiver includes first through third light-receiving sections adjacently aligned for respectively receiving +1st order diffraction rays of the main beam, the first sub-beam and the second sub-beam generated in the polarization hologram, the first light-receiving section is divided into two regions by a border extending in a radial direction, and is disposed in a portion where it can receive a +1st order diffraction ray of the main beam from the polarization hologram, so as to detect a spherical aberration, the second light-receiving section is divided into two regions by a border extending in the radial direction, and is disposed in a portion where it can receive a +1st order diffraction ray of the first sub-beam from the polarization hologram, so as to detect a spherical aberration, the second light-receiving section includes two photodiodes having respective light-receiving regions which are identical in size and each of which corresponds to a half of the second light-receiving section, the third light-receiving section is divided into two regions by a border extending in the radial direction, and is disposed in a portion where it can receive a +1st order diffraction ray of the second sub-beam from the polarization hologram, so as to detect a spherical aberration, the third light-receiving section includes two photodiodes having respective light-receiving regions which are identical in size and each of which corresponds to a half of the third light-receiving section, the second and third light-receiving sections are laid out such that an end of the second light-receiving section along the tangential direction and an opposite end of the third light-receiving section along the tangential direction are aligned on a straight line extending in the tangential direction across the first light-receiving section, the tangential direction and the radial direction are perpendicular to each other on a surface on which the first, second, and third light-receiving sections are disposed, and the first, second, and third light-receiving sections are separate light-receiving sections from each other.

2. The spherical aberration detecting device as set forth in claim 1, wherein the polarization hologram includes a diffraction region surrounded by a straight line in the radial direction orthogonal to an optical axis of the light beam, a first semicircle, and a second semicircle which is concentric to a first semicircle and smaller in radius than the first semicircle, the diffraction region emitting the +1st order diffraction rays of the main beam, the first sub-beam and the second sub-beam.

3. The spherical aberration detecting device as set forth in claim 1, further comprising:
   a first subtraction circuit for calculating a difference between light detection signals outputted from the two light-receiving regions constituting the first light-receiving section;
   a second subtraction circuit for calculating a difference between light detection signals outputted from the two light-receiving regions constituting the second light-receiving section;
   a third subtraction circuit for calculating a difference between light detection signals outputted from the two light-receiving regions constituting the third light-receiving section;
   a fourth subtraction circuit for calculating a difference between an output of the second subtraction circuit and an output of the third subtraction circuit; and
   an addition circuit for calculating a sum of an output of the first subtraction circuit and an output of the fourth subtraction circuit.

4. An optical pickup device including the spherical aberration detecting device as set forth in claim 1, 2 or 3.

\* \* \* \* \*